(12) United States Patent
Fleming et al.

(10) Patent No.: US 11,619,320 B2
(45) Date of Patent: Apr. 4, 2023

(54) VALVE SYSTEM

(71) Applicant: Consolidated Edison Company of New York, Inc., New York, NY (US)

(72) Inventors: James Fleming, Hopewell Junction, NY (US); Joseph Sherman, Mahopac, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 0 days.

(21) Appl. No.: 17/152,055

(22) Filed: Jan. 19, 2021

(65) Prior Publication Data

US 2022/0228673 A1 Jul. 21, 2022

(51) Int. Cl.
*F16K 17/32* (2006.01)
*F16K 31/53* (2006.01)
*F16K 27/00* (2006.01)

(52) U.S. Cl.
CPC ............ *F16K 31/535* (2013.01); *F16K 17/32* (2013.01); *F16K 27/00* (2013.01)

(58) Field of Classification Search
CPC .............................. F16K 17/32; F16K 31/535
USPC .......... 137/614.11, 614.13, 614.15; 251/248, 251/250.5
See application file for complete search history.

(56) References Cited

U.S. PATENT DOCUMENTS

| | | | | |
|---|---|---|---|---|
| 3,007,489 A | * | 11/1961 | Biddle | .................... F16K 31/44 137/554 |
| 4,749,004 A | * | 6/1988 | Peash | .................... F16K 11/165 137/865 |
| 2002/0162986 A1 | * | 11/2002 | Rocheleau | ............ F16K 27/067 251/315.1 |

* cited by examiner

*Primary Examiner* — Paul J Gray
(74) *Attorney, Agent, or Firm* — Cantor Colburn LLP

(57) ABSTRACT

A valve system includes a housing that houses a fluid path having an inlet side and an outlet side, and a fluid purge port disposed at and in fluid communication with the outlet side of the fluid path. The housing includes: an inlet valve disposed in fluid communication with the fluid path at the inlet side and in operable communication with an inlet gear; an outlet valve disposed in fluid communication with the fluid path at the outlet side and in operable communication with an outlet gear; and a control gear disposed in operable communication with both the inlet gear and the outlet gear.

17 Claims, 3 Drawing Sheets

VALVE SYSTEM

BACKGROUND

The present disclosure relates generally to a valve system, particularly to a valve system operably controlled by gears, and more particularly to a gear controlled valve system for use in the gas utility industry.

The gas utility industry uses valves in various locations within a gas distribution system, including a single curb-side shut off valve, for isolating gas distribution from a service supply to a service demand. While existing gas shut off valves may be suitable for their intended purpose, the art of valve-type gas shut-off systems would be enhanced with a valve system that can provide enhanced safety in isolating the service demand from the service supply in the event of an emergency, or otherwise.

BRIEF SUMMARY

An embodiment includes, a valve system having a housing that houses a fluid path having an inlet side and an outlet side, and a fluid purge port disposed at and in fluid communication with the outlet side of the fluid path. The housing includes: an inlet valve disposed in fluid communication with the fluid path at the inlet side and in operable communication with an inlet gear; an outlet valve disposed in fluid communication with the fluid path at the outlet side and in operable communication with an outlet gear; and a control gear disposed in operable communication with both the inlet gear and the outlet gear.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

Figure 1:
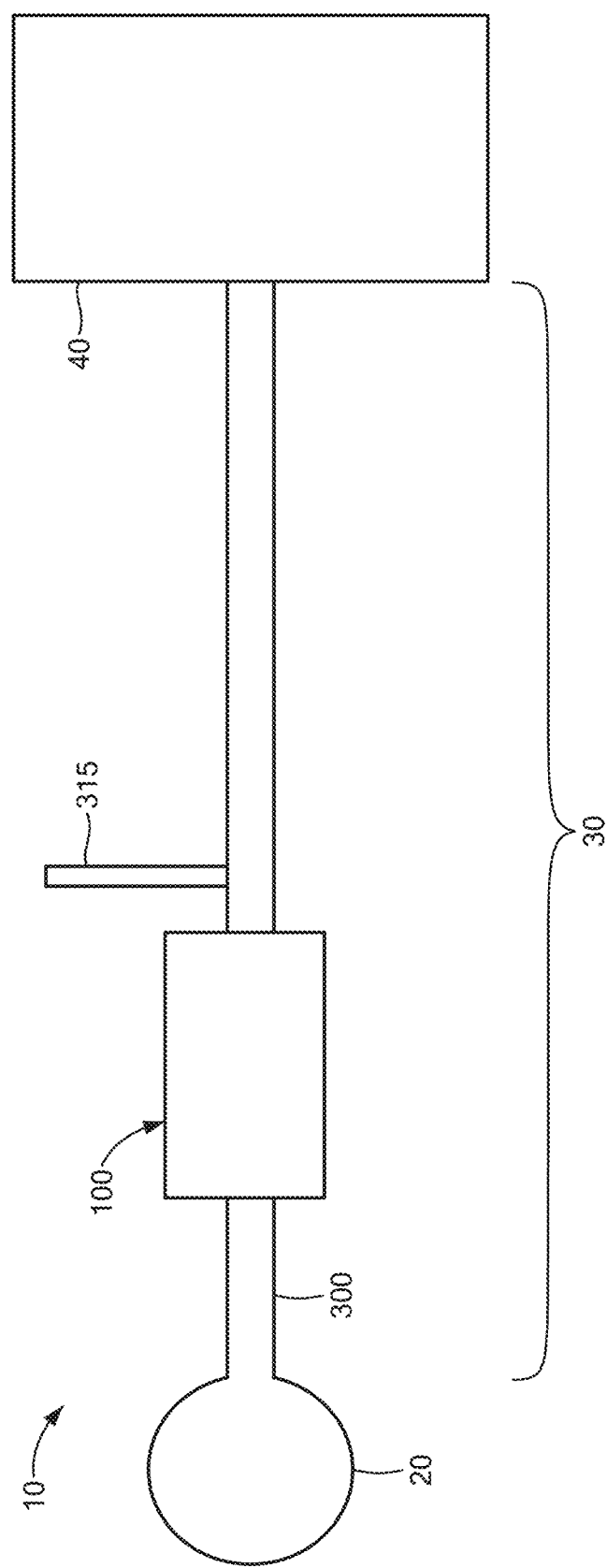
FIG. 1 depicts in block diagram form an example distribution system, in accordance with an embodiment.

One skilled in the art will understand the drawings, described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements.

DETAILED DESCRIPTION

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Accordingly, the following example embodiments are set forth without any loss of generality to, and without imposing limitations upon, the claimed invention disclosed herein.

An embodiment, as shown and described by the various figures and accompanying text, provides a valve system 100 for use in a gas distribution system 10, wherein the valve system 100 includes an inlet valve 400 and an outlet valve 500 synchronously controlled by a control gear 650 to efficiently control the flow, or absence thereof, of a gas 150 from a service supply 20, such as provided by a utility service provider, to a service demand 40, also herein referred to as a service building, via a fluid flow path 300, such as gas distribution line. While an embodiment described and illustrated herein depicts a fluid flow path 300 suitable as a gas distribution line, it will be appreciated that the disclosed invention may also be applicable to other fluid paths, such as a liquid path for example. While and embodiment described and illustrated herein may be directed to a gas 150 in a gas distribution line 300, where the gas 150 from a gas utility service provider may be natural gas, it will be appreciated that embodiments of the invention may be suitable for use with other forms of gas, such as but not limited to: Liquefied Petroleum Gas (LPG); propane; butane; hydrogen; or any other form of gas suitable for use in accordance with an embodiment disclosed herein.

Reference is now made to FIG. 1, which depicts a gas distribution system 10 that provides gas delivery service from a service supply 20 to a service demand 40 via a gas distribution path 30, where the gas distribution path 30 includes a gas distribution line 300 with an intermediate valve system 100 and fluid purge port 315, which will now be described in more detail with reference to FIGS. 2A-2C.

Figure 2A:
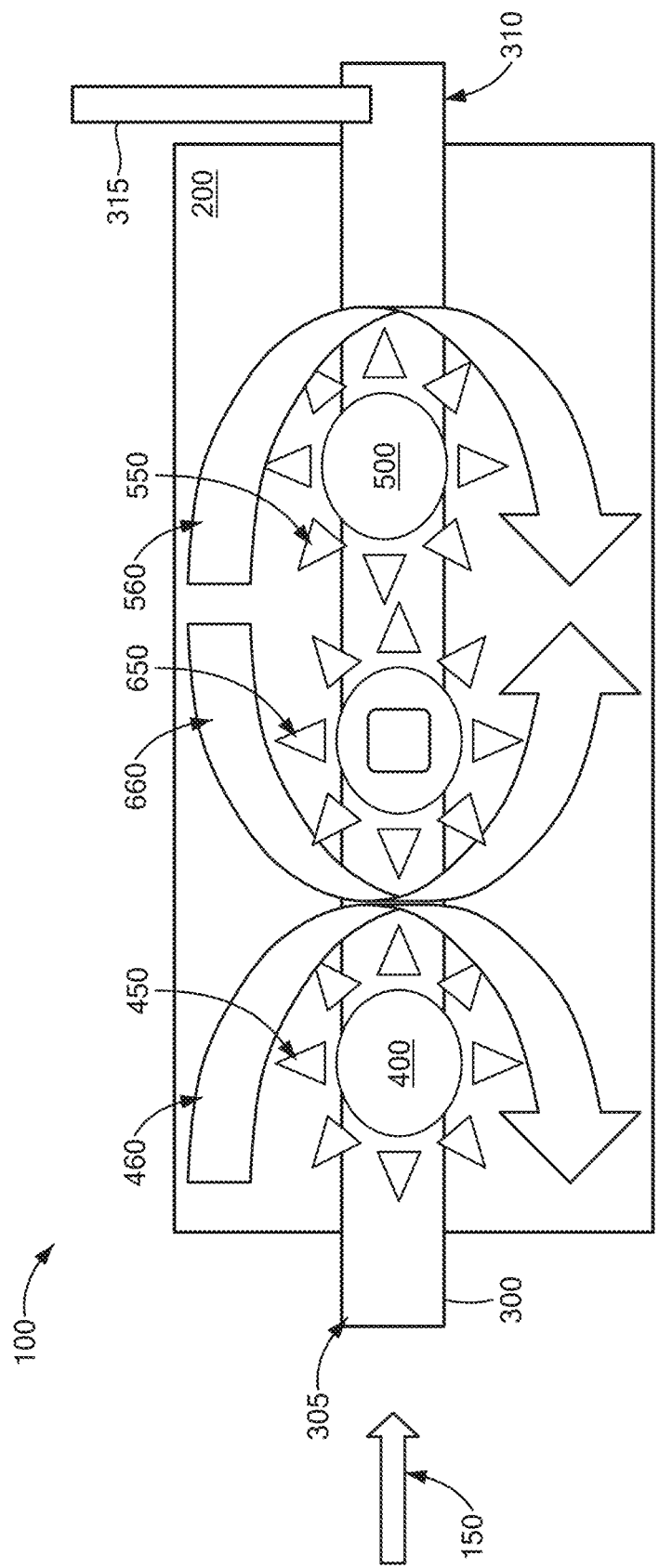
FIGS. 2A, 2B and 2C, depict in block diagram form an example valve system in various modes of operation and useful in the distribution system of FIG. 1, in accordance with an embodiment.

As depicted in FIG. 2A, the valve system 100 includes a housing 200, also herein referred to as a curb box as the housing 200 may be installed subterranean at a curb of a road, that houses a fluid path 300 having an inlet side 305 and an outlet side 310, and a fluid purge port 315 disposed at and in fluid communication with the outlet side 310 of the fluid path 300. The housing 200 includes an inlet valve 400 disposed in fluid communication with the fluid path 300 at the inlet side 305 and in operable communication or engagement with an inlet gear 450, an outlet valve 500 disposed in fluid communication with the fluid path 300 at the outlet side 310 and in operable communication or engagement with an outlet gear 550, and a control gear 650 disposed in operable communication or engagement with both the inlet gear 450 and the outlet gear 550.

In an embodiment, the housing 200 is fabricated from a plastic material. In an embodiment, the fluid path 300 is fabricated from a plastic material. In an embodiment, at least one or both of the inlet valve 400 and the outlet valve 500 is fabricated from a plastic material. In an embodiment, at least one or both of the inlet gear 450 and the outlet gear 550 is fabricated from a plastic material. In an embodiment, the aforementioned plastic material is PVC (polyvinylchloride), or any other plastic suitable for a purpose disclosed herein. The inlet valve 400 and the outlet valve 500 may each be connected to the fluid flow path 300 via any one or more of the following connections: an electro-fused connection; a butt-fused connection; or, a mechanical connection.

Figure 2B:
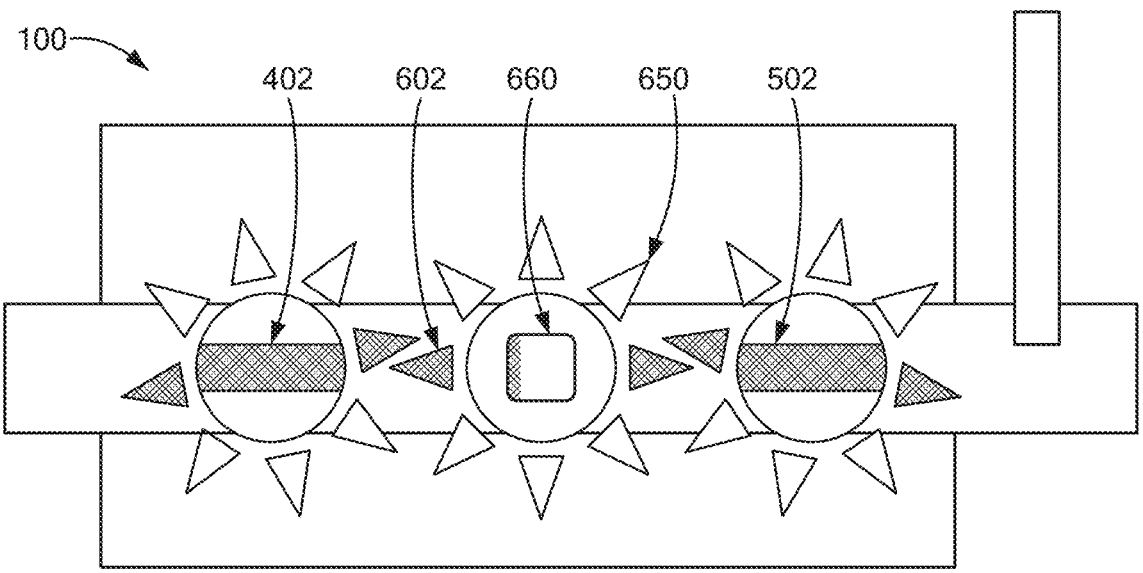
Figure 2C:
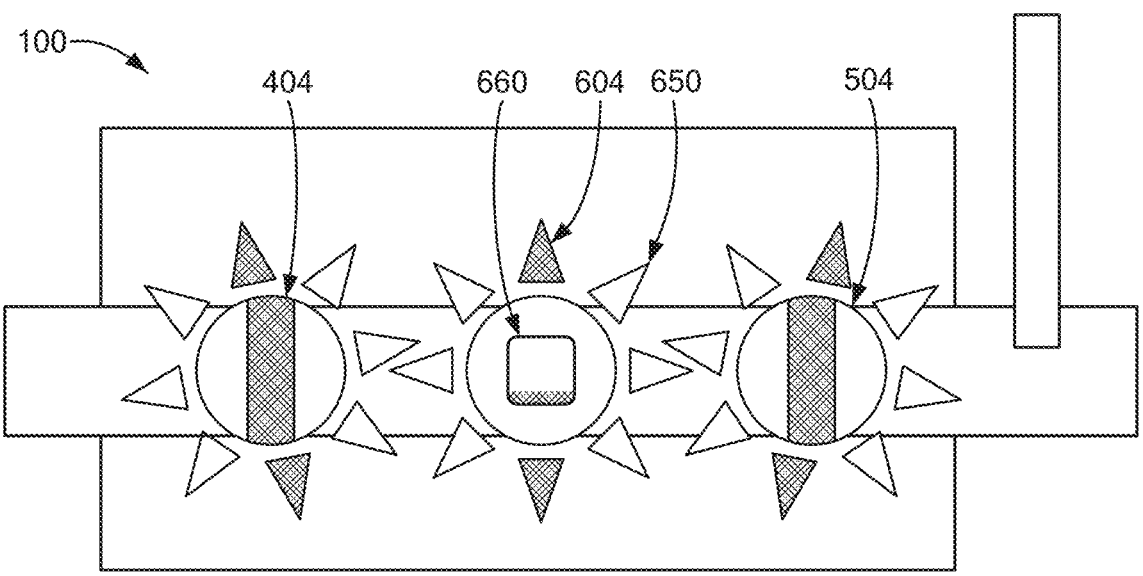

With reference still to FIGS. 2A-2C, an embodiment includes an arrangement where the inlet gear 450 is disposed in mechanical communication or engagement with the inlet valve 400, and the outlet gear 550 is disposed in mechanical communication or engagement with the outlet valve 500. In an embodiment, the inlet gear 450 is disposed in direct mechanical communication or engagement with the inlet valve 400, and the outlet gear 550 is disposed in direct mechanical communication or engagement with the outlet valve 500. Alternatively, the inlet gear 450 may be disposed in electrical or electronic control communication or engagement with the inlet valve 40, and the outlet gear 550 may be disposed in electrical or electronic communication or engagement with the outlet valve 500, where the electrical or electronic communication or engagement may be accomplished via servomechanisms or servomotors, or any other control means suitable for a purpose disclosed herein.

In an embodiment, the control gear 650 is operably disposed to simultaneously operate the inlet gear 450 and the outlet gear 550 in unison to operate the corresponding inlet valve 400 and outlet valve 500 between open 402, 502 and closed 404, 504 positions. In an embodiment, the control gear 650 is disposed in direct mechanical communication with both the inlet gear 450 and the outlet gear 550. Alternatively, the control gear 650 is disposed in electrical or electronic communication with both the inlet gear 450 and the outlet gear 550 via servomechanisms or servomotors, or any other control means suitable for a purpose disclosed herein.

With particular reference to FIGS. 2B and 2C, in combination with FIG. 2A, the control gear 650 is configured to operate both the inlet valve 400 and the outlet valve 500 between the open position 402, 502 and closed position 404, 504, respectively, via the corresponding inlet gear 450 and outlet gear 550 with the turning of the control gear 650 by a defined amount. In an embodiment, the turning of the control gear 650 by a defined amount to transition between the open position 402, 502 and the closed position 404, 504 is accomplished with a turn of the control gear 650 that is equal to or greater than a $\frac{1}{8}^{th}$ turn and equal to or less than a $\frac{3}{8}^{th}$ turn. In an embodiment, the control gear 650 is mechanically turned by a tool (not shown) that is configured to fit within a fitting 660 of the control gear 650 that is suitably sized to receive the tool and the operational torque that the tool imparts on the fitting 660 to effect operational control of the inlet gear 450 and outlet gear 550 via the control gear 650. In an embodiment, the control gear 650 is configured to operate the inlet valve 400 and the outlet valve 500 between the open 402, 502 and closed 404, 504 positions via the corresponding inlet gear 450 and outlet gear 550 with a ¼ turn of the control gear 650. Alternative to the above noted degree of turn of the control gear 650, it will be appreciated that depending on the size of the valves 400, 500 used for a particular application, multiple turns of the control gear 650 may be required to establish full open and full closed positions of the valves, which would be accomplished through an appropriate gear ratio between the control gear 650 and the inlet and outlet gears 450, 550. The degree of turn of the control gear 650 to facilitate proper operation of the inlet and outlet valves 400, 500 is predetermined prior to installation of the valve system 100 in the curb box 200.

As depicted in FIGS. 2B and 2C, the control gear 650 is operable between a first stop position 602 and a second stop position 604, the first stop position 602 being productive of the inlet valve 400 and the outlet valve 500 both being in an open position 402, 502, the second stop position 604 being productive of the inlet valve 400 and the outlet valve 500 both being in a closed position 404, 504.

With particular reference now back to FIG. 2A, in response to the control gear 650 being operated in a first direction 660, the inlet gear 450 and the outlet gear 550 are both configured to operate in a second direction 460, 560 that is opposite to the first direction 660. As depicted in FIG. 2A, the first direction 660 is a counterclockwise direction, and the second direction 460, 560 is a clockwise direction. However, it will be appreciated that the first direction 660 and the second direction 460, 560 may be reversed. Also, it will be appreciated that while embodiments are depicted herein having rotational first and second directions, that a scope of the invention is not so limited and encompasses linear first and second directions, or a combination of rotational and linear first and second directions, that may be accomplished by a worm gear system for example. In an embodiment, the inlet gear 450 and the outlet gear 550 are non-adjustable with respect to each other and with respect to the control gear 650 once the valve system 100 in installed in situ. By providing a non-adjustable valve system 100, the two valve gears 450, 550 can synchronized to the central control gear 650 on installation and maintained as non-adjustable once installed, thereby providing synchronized open and close actions and final on/off positions.

With respect to the foregoing description of structure of the valve system 100, an embodiment includes an arrangement that includes one or more of the following: the fluid flow path 300 has a nominal internal diameter of equal to or greater than ½ inch and equal to or less than 6 inches; the gas 150 and fluid path 300 is operable at a nominal gauge pressure up to and including 12-inch water column (WC) pressure, of equal to or greater than 1 psig and equal to or less than 5 psig, of equal to or greater than 2 psig and equal to or less than 15 psig, or of equal to or greater than 15 psig and equal to or less than 125 psig; the control gear 650 is configured to be operable with a torque value of equal to or greater than 30 foot-pounds and equal to or less than 55 foot-pounds, or equal to or greater than 40 foot-pounds and equal to or less than 45 foot-pounds; and, the operable communication between the control gear 650 and the inlet and outlet gears 450, 550 is operable at any gear ratio between the control gear 650 and the inlet and outlet gears 450, 550 to effectively open/close the inlet and outlet valves 400, 500 with only a quarter-turn of the inlet and outlet valves 400, 500.

During a gas utility service procedure that calls for disconnection or disruption of gas service between the service supply 20 and the service demand 40, the control gear 650 may be conveniently accessed via the curb box 200 and actuated via the fitting 660 to operably and synchronously close the inlet and outlet valves 400, 500 via the corresponding inlet and outlet gears 450, 550. By providing a synchronously controlled double-valve shutoff valve system 100, the fluid purge port 315 may be opened to purge trapped gas between the curb box 200 and the service demand 40 with improved safety as compared to a single valve system where the single valve may not properly close when actuated.

As disclosed herein, and with respect to the foregoing description of structure of the valve system 100, some embodiment may include one or more of the following advantages: the valve system 100 may be useful to safely and efficiently purge the gas distribution line 300 between the utility curb box 200 and the service building 40 in case of an emergency; the valve system 100 may be useful to safely and efficiently test the "hold pressure" in the gas distribution line 300 between the utility curb box 200 and the service building 40; the valve system 100 may be useful to safely and efficiently perform a temporary shutoff and purge of the gas service from the service supply 20 to the service building 40 at the request of a seller of the service building 40, in the event of a non-paying customer who occupies the service building 40, or for any other reason; the two shutoff valves 400, 500 of the valve system 100 may be useful to provide a second level of safety in case one of the valves is non-functioning due to debris or other reason, as compared to a single valve system; and, efficient access to gas service operations may be accomplished without the need to dig out the gas distribution line 300 in order to cut and cap the gas service at the curb in systems absent a curb box.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A valve system, comprising:
   a housing that houses a fluid path having an inlet side and an outlet side;
   a fluid purge port disposed at and in fluid communication with the outlet side of the fluid path;
   the housing comprising:
   an inlet valve disposed in fluid communication with the fluid path at the inlet side and in operable communication with an inlet gear;
   an outlet valve disposed in fluid communication with the fluid path at the outlet side and in operable communication with an outlet gear; and
   a control gear disposed in direct mechanical operable communication with both the inlet gear and the outlet gear;
   wherein the control gear is operably disposed to simultaneously operate the inlet gear and the outlet gear together and at the same time to operate the corresponding inlet valve and outlet valve between open and closed positions at the same time to provide a synchronously controlled double-valve shutoff;
   wherein the inlet valve and the outlet valve are configured to be in the closed position at the same time and in the open position at the same time;
   wherein in response to the control gear being operated in a first direction, the inlet gear and the outlet gear are both configured to operate in a second direction that is opposite to the first direction;
   wherein the control gear is configured to operate the inlet valve and the outlet valve between the open and closed positions via the corresponding inlet gear and outlet gear with a turn of the control gear that is equal to or greater than a $\frac{1}{8}^{th}$ turn and equal to or less than a $\frac{3}{8}^{th}$ turn.

2. The valve system of claim 1, wherein:
   the inlet gear is disposed in mechanical communication with the inlet valve; and
   the outlet gear is disposed in mechanical communication with the outlet valve.

3. The valve system of claim 2, wherein:
   the inlet gear is disposed in direct mechanical communication with the inlet valve; and
   the outlet gear is disposed in direct mechanical communication with the outlet valve.

4. The valve system of claim 1, wherein:
   the control gear is configured to operate the inlet valve and the outlet valve between the open and closed positions via the corresponding inlet gear and outlet gear with a ¼ turn of the control gear.

5. The valve system of claim 1, wherein the first direction is a counterclockwise direction, and the second direction is a clockwise direction.

6. The valve system of claim 1, wherein:
   the control gear is operable between a first stop position and a second stop position, the first stop position being productive of the inlet valve and the outlet valve both being in an open position, the second stop position being productive of the inlet valve and the outlet valve both being in a closed position.

7. The valve system of claim 1, wherein:
   the fluid flow path, the inlet valve, and the outlet valve, are configured to receive fluid in the form of a gas.

8. The valve system of claim 7, wherein:
   the gas and fluid path is operable at a nominal gauge pressure of equal to or less than 125 psig.

9. The valve system of claim 1, wherein:
   the fluid flow path has a nominal internal diameter of equal to or greater than ½ inch and equal to or less than 6 inches.

10. The valve system of claim 1, wherein:
the control gear is configured to be operable with a torque value of equal to or greater than 30 foot-pounds and equal to or less than 55 foot-pounds.

11. The valve system of claim 1, wherein:
the operable communication between the control gear and the inlet and outlet gears is operable at any gear ratio between the control gear and the inlet and outlet gears to effectively open or close the inlet and outlet valves with only a quarter-turn of the inlet and outlet valves.

12. The valve system of claim 1, wherein:
at least one of the inlet gear and the outlet gear is fabricated from a plastic material.

13. The valve system of claim 1, wherein:
at least one of the inlet valve and the outlet valve is fabricated from a plastic material.

14. The valve system of claim 1, wherein:
the fluid path is fabricated from a plastic material.

15. The valve system of claim 1, wherein:
the housing is fabricated from a plastic material.

16. The valve system of claim 1, wherein:
the inlet valve and the outlet valve are each connected to the fluid flow path via any one of the following: an electro-fused connection; a butt-fused connection; or, a mechanical connection.

17. The valve system of claim 1, wherein:
the inlet gear and the outlet gear are non-adjustable with respect to each other and with respect to the control gear.

* * * * *